(12) United States Patent
Hitomi

(10) Patent No.: US 12,314,355 B2
(45) Date of Patent: May 27, 2025

(54) INFORMATION PROCESSING SYSTEM, DEVICE, AND AUTHENTICATION METHOD

(71) Applicant: Keiichiro Hitomi, Tokyo (JP)

(72) Inventor: Keiichiro Hitomi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 174 days.

(21) Appl. No.: 17/930,151

(22) Filed: Sep. 7, 2022

(65) Prior Publication Data

US 2023/0114172 A1 Apr. 13, 2023

(30) Foreign Application Priority Data

Oct. 8, 2021 (JP) .................................. 2021-166249

(51) Int. Cl.
*G06F 21/31* (2013.01)

(52) U.S. Cl.
CPC .................................. *G06F 21/31* (2013.01)

(58) Field of Classification Search
CPC ............. G06F 21/31; G06F 2221/2115; G06F 21/629; G06F 21/608
See application file for complete search history.

(56) References Cited

U.S. PATENT DOCUMENTS

| | | | | |
|---|---|---|---|---|
| 2014/0033287 A1* | 1/2014 | Kawai | ................ | H04N 1/00326 726/7 |
| 2016/0014293 A1* | 1/2016 | Iwai | ................... | H04N 1/00949 358/1.15 |
| 2018/0270216 A1 | 9/2018 | Nakayama | | |
| 2019/0132146 A1* | 5/2019 | Flack | ..................... | H04W 12/08 |
| 2020/0296572 A1* | 9/2020 | Bachmutsky | ......... | H04W 12/61 |
| 2021/0099599 A1 | 4/2021 | Han et al. | | |
| 2021/0136252 A1* | 5/2021 | Fukuda | .............. | H04N 1/32106 |
| 2021/0377250 A1 | 12/2021 | Hitomi | | |

FOREIGN PATENT DOCUMENTS

| | | |
|---|---|---|
| JP | 2002-055801 | 2/2002 |
| JP | 2011-037161 | 2/2011 |
| JP | 2012-038189 | 2/2012 |
| JP | 2021-056982 | 4/2021 |
| JP | 2021-057771 | 4/2021 |

OTHER PUBLICATIONS

Extended European Search Report for 22193869.9 mailed on Mar. 15, 2023.
U.S. Appl. No. 17/652,182 filed Feb. 23, 2022, Keiichiro Hitomi.

* cited by examiner

*Primary Examiner* — Henry Tsang
*Assistant Examiner* — Suman Debnath
(74) *Attorney, Agent, or Firm* — IPUSA, PLLC

(57) ABSTRACT

An information processing system, a device, and an authentication method. The information processing system includes an information processing apparatus and a device communicably connected to the information processing apparatus, and the device requests the information processing apparatus for account information in response to receiving a predetermined operation, and the information processing apparatus transmits the account information to the device, and the device requests authentication from an authentication server, designating the account information received from the information processing apparatus, and acquires an authentication result.

7 Claims, 12 Drawing Sheets

FIG. 7

| ON-PREMISES ACCOUNT INFORMATION | GUEST |

FIG. 8

| DEVICE NUMBER | LOGIN BY GUEST USER |
| --- | --- |
| A001 | VALID |
| A002 | INVALID |
| A003 | VALID |
| ... | ... |

FIG. 9

| USER ID | ACCOUNT INFORMATION (PASSWORD) |
| --- | --- |
| 001 | **** |
| 002 | **** |
| 003 | **** |
| ... | ... |
| GUEST | GUEST |

FIG. 10

| USAGE RESTRICTION INFORMATION OF GUEST USER | COPY: BLACK AND WHITE PERMITTED<br>PRINT: RESTRICTED<br>FACSIMILE: PERMITTED<br>SCAN: PERMITTED<br>DOCUMENT BOX: PERMITTED |

FIG. 12

Guest Login Settings
・Valid/Invalid Functions

Guest User Account
User ID: Guest

Usage Restriction Settings  Change

Save

■ Set by Device

| | Device Display Name | Model Name | Device Number | Location | Version |
|---|---|---|---|---|---|
| ●Valid ○Invalid | MFP001 | M001 | xxxx | Office A | 1.04.1 |
| ●Valid ○Invalid | MFP002 | M001 | xxxx | Office B | 1.04.1 |
| ●Valid ○Invalid | MFP003 | M002 | xxxx | Office C | 1.04.1 |
| ●Valid ○Invalid | MFP004 | M002 | xxxx | Office D | |
| ●Valid ○Invalid | MFP005 | M002 | xxxx | Office E | |

FIG. 13

210 taro
Tenant ID : 1106563557

Copy
211a
211b
- ● Full Color/Dual Color/Single Color/Black and White
- ○ Full Color (Automatic Selection)/Dual Color/Single Color/Black and White
- ○ Dual Color/Single Color/Black and White
- ○ Single Color/Black and White
- ○ Black and White
- ○ None (Not Available)

Print
212a
212b
- ● Full Color/Dual Color/Single Color/Black and White
- ○ Dual Color/Single Color/Black and White
- ○ Black and White
- ○ None (Not Available)

Facsimile
213a
213b
- ● Available
- ○ None (Not Available)

Scan
214a
214b
- ● Available
- ○ None (Not Available)

Document Box
215a
215b
- ● Available
- ○ None (Not Available)

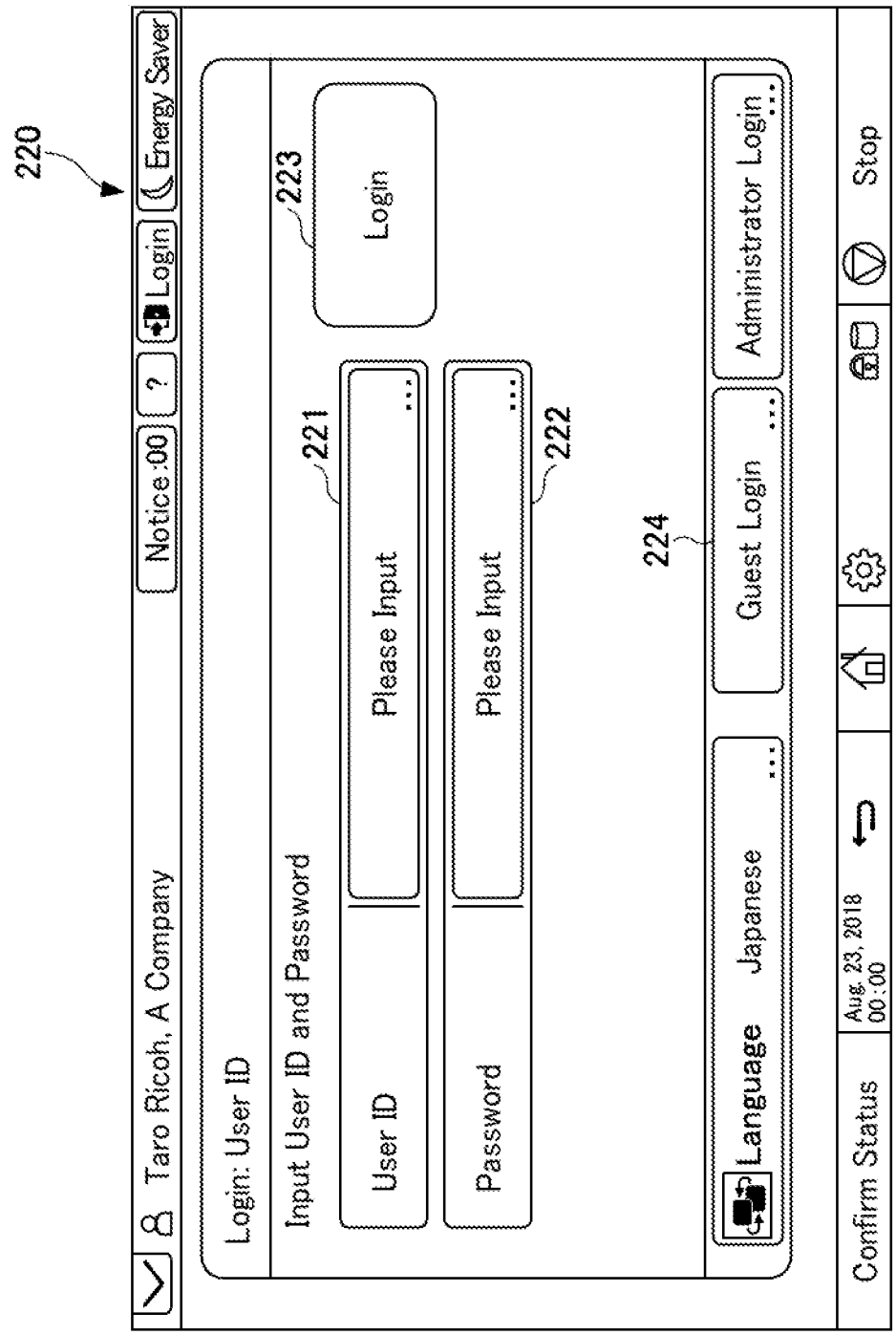

INFORMATION PROCESSING SYSTEM, DEVICE, AND AUTHENTICATION METHOD

CROSS-REFERENCE TO RELATED APPLICATIONS

This patent application is based on and claims priority pursuant to 35 U.S.C. § 119(a) to Japanese Patent Application No. 2021-166249, filed on Oct. 8, 2021, in the Japan Patent Office, the entire disclosure of which is hereby incorporated by reference herein.

BACKGROUND

Technical Field

The present disclosure relates to an information processing system, a device, and an authentication method.

Related Art

A user may be requested to login when the user uses a device such as an image forming apparatus. The login refers to an authentication act of accessing a resource of the device or a system to which the device is connected using account information registered in advance, for using various services on a computer or the internet.

SUMMARY

Embodiments of the present disclosure describe an information processing system, a device, and an authentication method. The information processing system includes an information processing apparatus and a device communicably connected to the information processing apparatus, and the device requests the information processing apparatus for account information in response to receiving a predetermined operation, and the information processing apparatus transmits the account information to the device, and the device requests authentication from an authentication server, designating the account information received from the information processing apparatus, and acquires an authentication result.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 7 is a table illustrating an example of on-premises account information stored in a management unit;

FIG. 8 is a table illustrating an example of guest login-permitted device information stored in the management unit;

FIG. 9 is a table illustrating an example of account information stored in an account information storage unit;

FIG. 10 is a table illustrating an example of usage restriction information stored in a usage restriction information storage unit;

FIG. 12 is a diagram illustrating an example of a guest login setting screen;

FIG. 13 is a diagram illustrating an example of a usage restriction setting screen;

FIG. 15 is a diagram illustrating an example of a login screen displayed by the device.

Figure 1:
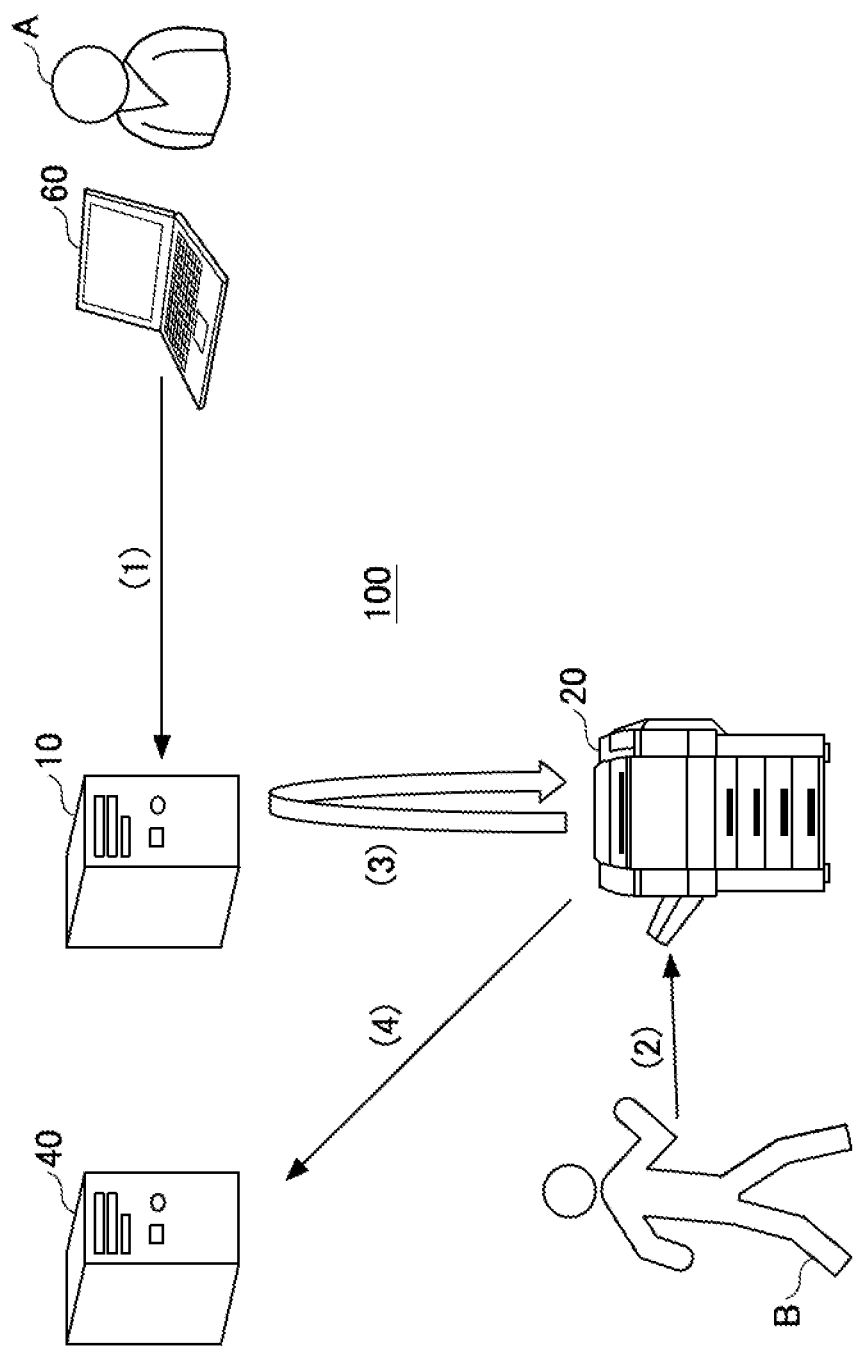
FIG. 1 is a diagram illustrating an outline of authentication process executed by an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of embodiments of an information processing system and an authentication method performed by the information processing system with reference to the drawings.

FIG. 1 is a diagram illustrating an outline of the authentication method performed by the information processing system 100.

(1) In response to input of guest user account information by an administrator A on a guest login setting screen described below, an information processing apparatus 10 stores an account for a guest user. The information processing apparatus 10 registers the guest user account information in an authentication server 40.

(2) An authentication application runs on a device 20 such as an image forming apparatus. A guest user B presses a guest login button displayed by the authentication application. The guest user B is not requested to enter account information. The guest login button is an example of an operation component that receives an operation from the user.

(3) The authentication application acquires the guest user account information from the information processing apparatus 10. The guest user account information may be common regardless of the guest user.

(4) The authentication application sends an authentication request to the authentication server 40 using the guest user account information. The guest user B logs in to the device based on a successful authentication.

In this manner, the information processing system 100 of the present embodiment permits the guest user B to use the device 20 without knowing (or inputting) the user account information.

Authentication refers to judging whether a user is a legitimate authorized person. In the present embodiment, authentication is whether or not the user is authorized to use the device. Based on the successful authentication, the user logs into the device or the information processing apparatus 10 via the device.

A login screen is a screen for the user to input account information. The login screen may also be called a sign-in screen or an authentication screen. The account information is information used for authentication. A person who knows the account information is presumed to be a rightful authority. The account information is a set of a plurality of pieces of information such as "mail address and password" and "tenant identifier (ID), user ID, and password". In the present embodiment, the information corresponding to the password is the account information.

An administrator is a system administrator or the like in a customer's organization who uses the information processing system 100, and is a person who sets the information processing system 100 for general users.

A guest user is a user who uses the device 20 temporarily. The guest user is also called a temporary user. A general user is a user who uses the device 20 continuously, such as an employee of a customer. When there is no distinction between the guest user and general user, the guest user and general user are simply referred to as users.

Figure 2:
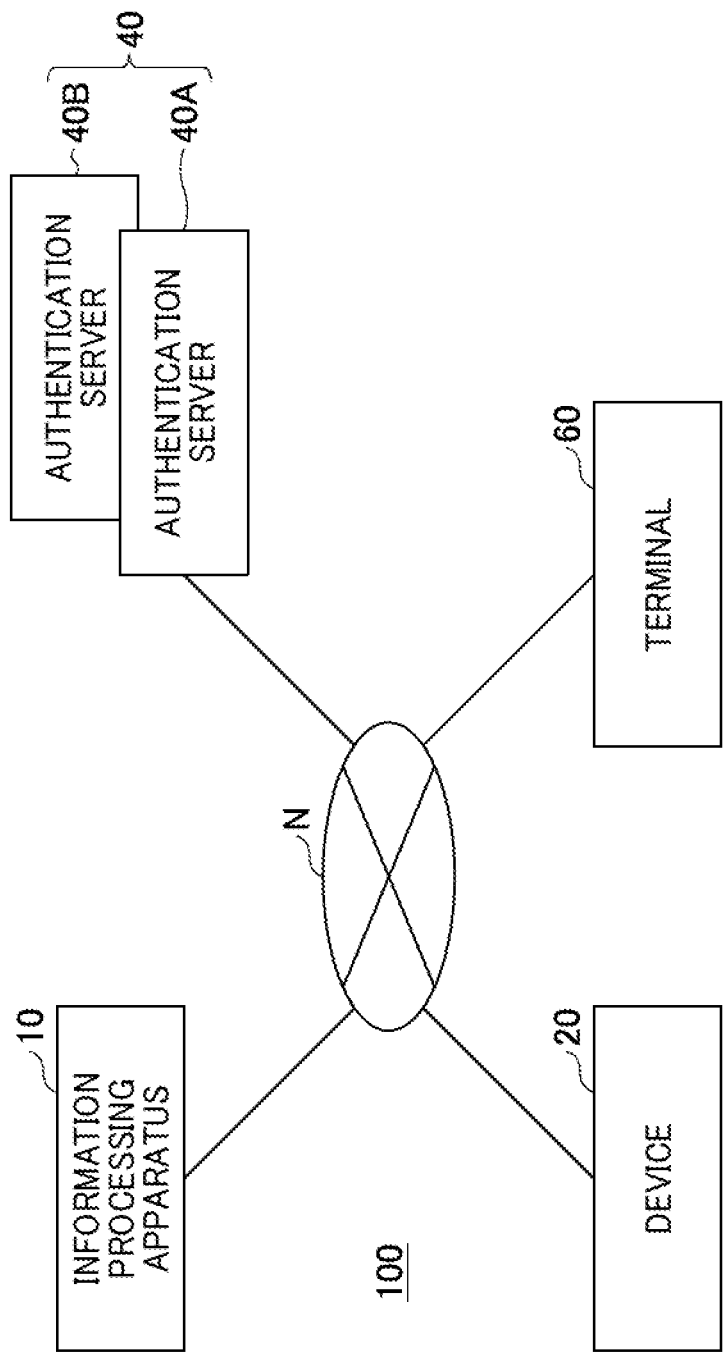
FIG. 2 is a block diagram illustrating a system configuration of an example of the information processing system according to embodiments of the present disclosure.

A system configuration of the information processing system 100 according to the present embodiment is described with reference to FIG. 2. FIG. 2 is a diagram illustrating an example of a system configuration of the information processing system 100 according to embodiments of the present disclosure.

The information processing system 100 illustrated in FIG. 2 includes the information processing apparatus 10 and the device 20, which are communicably connected via a wide area network N such as the internet. Further, the information processing apparatus 10 communicates with various authentication servers 40 and a terminal 60.

The information processing apparatus 10 is implemented by one or more computers, and provides various services to users via the network N alone or in cooperation with the authentication server 40. The information processing apparatus 10 according to the present embodiment provides a wide variety of services, including, for example, a workflow service that executes a series of processes such as document scanning, image data optical character recognition (OCR), and file uploading. A pull print in which the device 20 downloads and prints a file from a storage is an example of the service. In addition, the information processing apparatus 10 provides various services using the device 20.

The information processing apparatus 10 includes a function of authenticating a user who uses the device 20. The user is authenticated by either the information processing apparatus 10 or the authentication server 40. The administrator sets in advance which method is to be used for authentication (included in settings of the authentication method).

In the present embodiment, a case in which the authentication is done by the authentication server 40 is described.

The information processing apparatus 10 may be implemented by cloud computing, or may be implemented by a single information processing apparatus 10. The cloud computing refers to a usage pattern in which resources on a network are used without being aware of specific hardware resources. The information processing apparatus 10 may reside on the internet or may reside on-premises.

The device 20 is any one of various electronic devices used by the users. The device 20 is, for example, an image forming apparatus such as a multi-function peripheral (MFP), a projector, an electronic whiteboard, a teleconference terminal, a digital camera, or the like. In addition, a web browser or equivalent function will suffice as the device 20. The device 20 communicates with the information processing apparatus 10 or the authentication server 40 through the network N. The user uses the device 20 to use various services provided by the information processing apparatus 10 or the authentication server 40.

A plurality of authentication servers 40 may be implemented according to the functions. The authentication server 40 may be managed by a same operator as an operator of the information processing apparatus 10, or may be managed by a service operator different from the operator of the information processing apparatus 10. Respective authentication servers 40 of the plurality of authentication servers 40 are described as authentication servers 40A and 40B when distinguishing between the servers and when the servers are not distinguished, the authentication server 40 is simply referred to as "authentication server 40". The authentication server 40 is one or more computers.

Each authentication server 40 includes a function of authenticating users. The authentication server 40 supports OAUTH, for example OAUTH is a mechanism for operating multiple web services in cooperation. Normally, in order for users to use web services, the users are to enter user IDs and passwords individually, but by using OAUTH, the web services (the information processing apparatus 10 and the authentication server 40) are linked without entering the IDs and passwords individually. When OAUTH is used, the information processing apparatus 10 redirects the device 20 to the authentication server 40, and the authentication server 40 authenticates the user.

The terminal 60 is a general-purpose computer that communicates with the information processing apparatus 10. A web browser operates on the terminal 60 and displays various screens based on the screen information received from the information processing apparatus 10. The administrator sets, for example, the guest user account information on the screen.

The terminal 60 is, for example, a personal computer (PC), a smartphone, a tablet terminal, a personal digital assistant (PDA), or any other device as long as the web browser operates. Note that an application dedicated to the information processing apparatus 10 may operate on the terminal 60 instead of the web browser.

Hardware configurations of the information processing apparatus 10 and the device 20 included in the information processing system 100 according to the present embodiment are described with reference to FIGS. 3 and 4.

Figure 3:
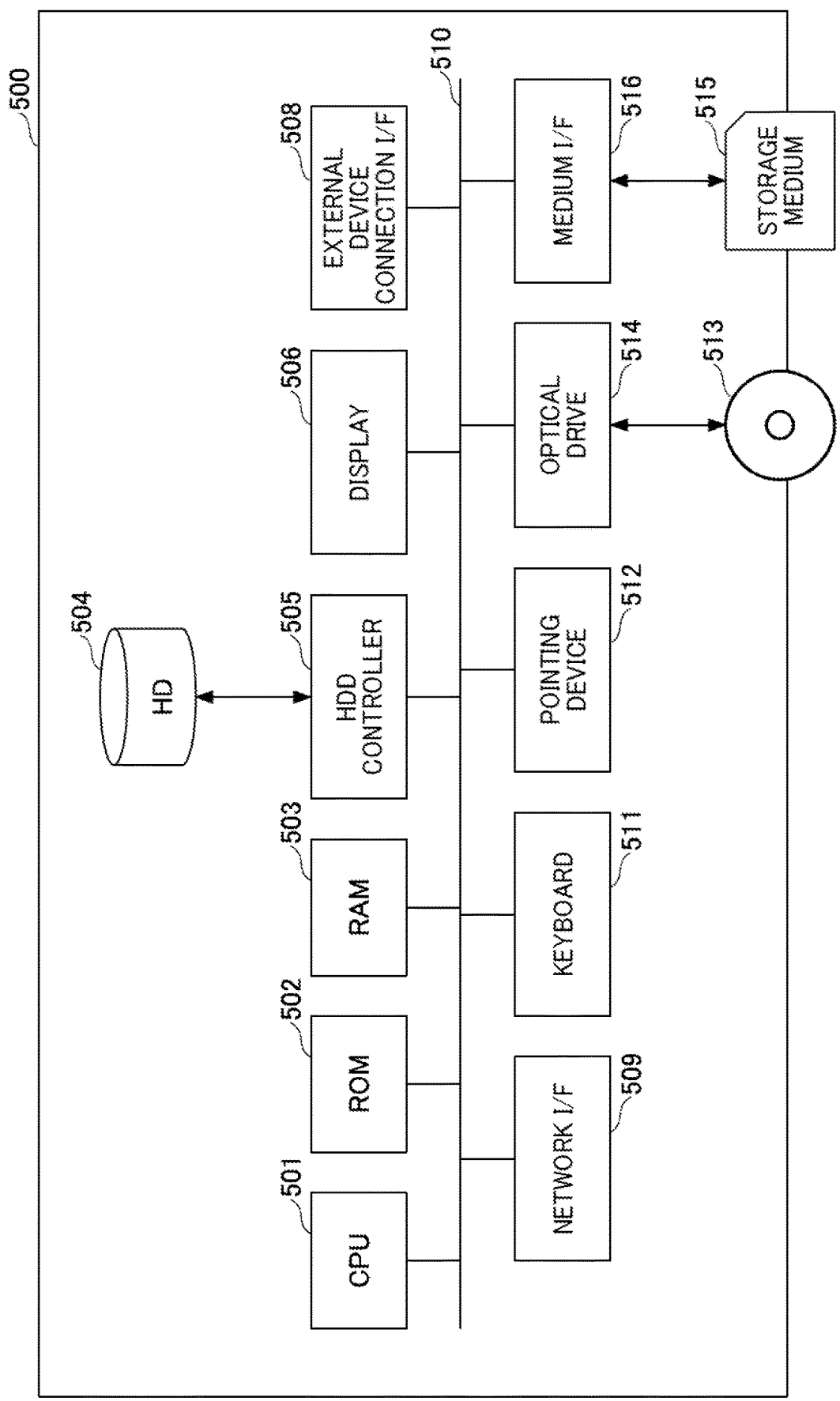
FIG. 3 is a block diagram illustrating a hardware configuration of an example of an information processing apparatus and a terminal.

FIG. 3 is a block diagram illustrating the hardware configuration of examples of the information processing apparatus 10 and the terminal 60. The hardware configuration of the authentication server 40 is the same as the hardware configuration of FIG. 3. The hardware configuration of the authentication server 40 may be different from FIG. 3, but is not an interference in the description of the present embodiment.

As illustrated in FIG. 3, each of the information processing apparatus 10 and the terminal 60 is implemented by a computer 500. The computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, and a medium I/F 516.

Among these elements, the CPU 501 controls entire operation of the computer 500. The ROM 502 stores a control program such as an initial program loader (IPL) to boot the CPU 501. The RAM 503 is used as a work area for the CPU 501. The HD 504 stores various data such as the programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a Universal Serial Bus (USB) memory, a printer, or the like. The network I/F 509 is an interface for performing data communication using the network N. The bus line 510 is an address bus, a data bus, or the like for electrically connecting each component such as the CPU 501 illustrated in FIG. 3.

Further, the keyboard 511 is an example of input device including a plurality of keys used for inputting characters, numerical values, various instructions, and the like. The pointing device 512 is an example of the input device that allows the user to select or execute a specific instruction, select a target for processing, or move a cursor being displayed. The optical drive 514 controls reading or writing of various data to an optical storage medium 513 as an example of a removable recording medium. The optical storage medium is a Compact Disc (CD), Digital Versatile Disc (DVD), BLU-RAY (registered trademark), or the like. The medium I/F 516 controls reading and writing (storing) of data from and to a storage medium 515 such as a flash memory.

Figure 4:
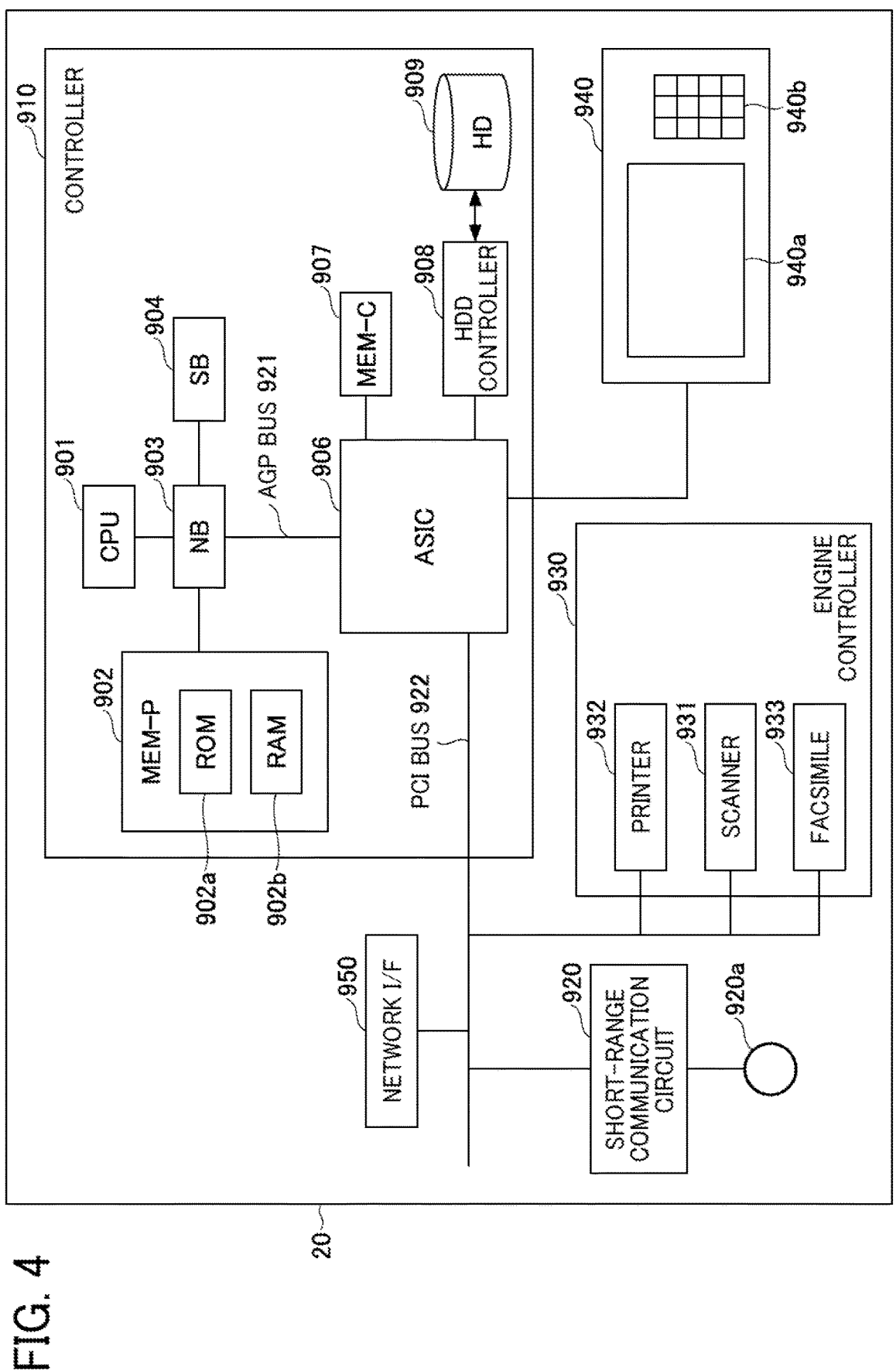
FIG. 4 is a block diagram illustrating a hardware configuration of an example of a device.

FIG. 4 is a block diagram illustrating a hardware configuration of the image forming apparatus as an example of the device 20. As illustrated in FIG. 4, the image forming apparatus includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the image forming apparatus. The NB 903 connects the CPU 901 with the MEM-P 902, SB 904, and AGP bus 921 and includes a memory controller for controlling reading or writing operation of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the ROM 902a may be stored in any computer-readable storage medium, such as a Compact Disc-Read Only Memory (CD-ROM), Compact Disc-Recordable (CD-R), or the DVD in a file format installable or executable by the computer for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907 as a bridge. The ASIC 906 is a PCI target and an AGP master, an arbiter (ARB) which is the core of the ASIC 906, a memory controller which controls MEM-C 907, a plurality of Direct Memory Access Controllers (DMACs) which rotate image data by hardware logic and the like, and a PCI unit that transfers data between a scanner 931, a printer 932, and a facsimile 933 through the PCI bus 922. The ASIC 906 may include a USB interface and an Institute of Electrical and Electronics Engineers 1394 (IEEE1394) interface.

The MEM-C 907 is a local memory used as a buffer for image data to be copied or a code buffer. The HD 909 is a storage that stores image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

Further, the engine controller 930 includes the scanner 931, the printer 932, and the facsimile 933. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls entire operation of the image forming apparatus. For example, the controller 910 controls rendering, communication, or user inputs to the control panel 940. The scanner 931 or the printer 932 includes an image processing unit such as error diffusion processing and gamma conversion processing.

Note that the image forming apparatus switches and selects a document box function, copy function, print function, and facsimile function in sequence using an application switching key on the control panel 940. When the user selects the document box function, the image forming apparatus enters the document box mode, when the user selects the copy function, the image forming apparatus enters the copy mode, when the print function is selected, the printer mode, and when the facsimile mode is selected, the facsimile mode.

The network I/F 950 is an interface for performing data communication using the network N. The short-range communication circuit 920 and the network I/F 950 are electrically connected to the ASIC 906 through the PCI bus 922.

Figure 5:
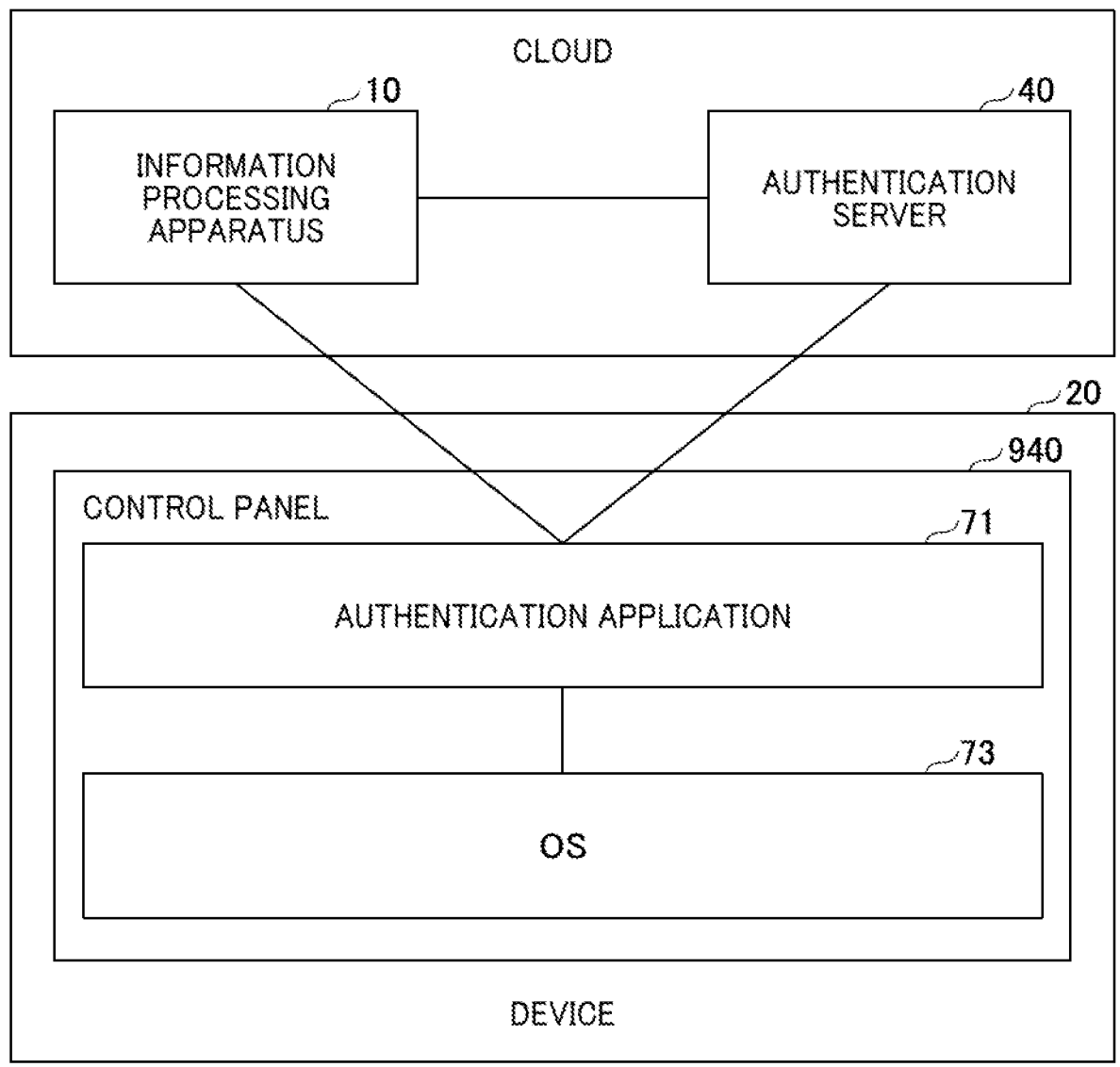
FIG. 5 is a block diagram illustrating an example of software configuration of the device.

FIG. 5 is a block diagram illustrating a software configuration of the device 20. As illustrated in FIG. 5, the device 20 includes an authentication application 71 operating on the control panel 940. The authentication application 71 is operating on an operating system (OS) 73. The OS 73 is, for example, ANDROID (registered trademark), but any type of OS 73, such as LINUX (registered trademark), is applicable as long as the authentication application 71 operates.

The guest user account information registered by the administrator is stored in the information processing apparatus 10 and the authentication server 40. The authentication application 71 acquires the guest user account information from the information processing apparatus 10 and transmits the account information to the authentication server 40 to request authentication of the guest user. The authentication server 40 authenticates based on the guest user account information. In response to a successful authentication by the authentication server 40, the authentication server 40 notifies the authentication application 71 to enable the guest user to use the device 20.

Figure 6:
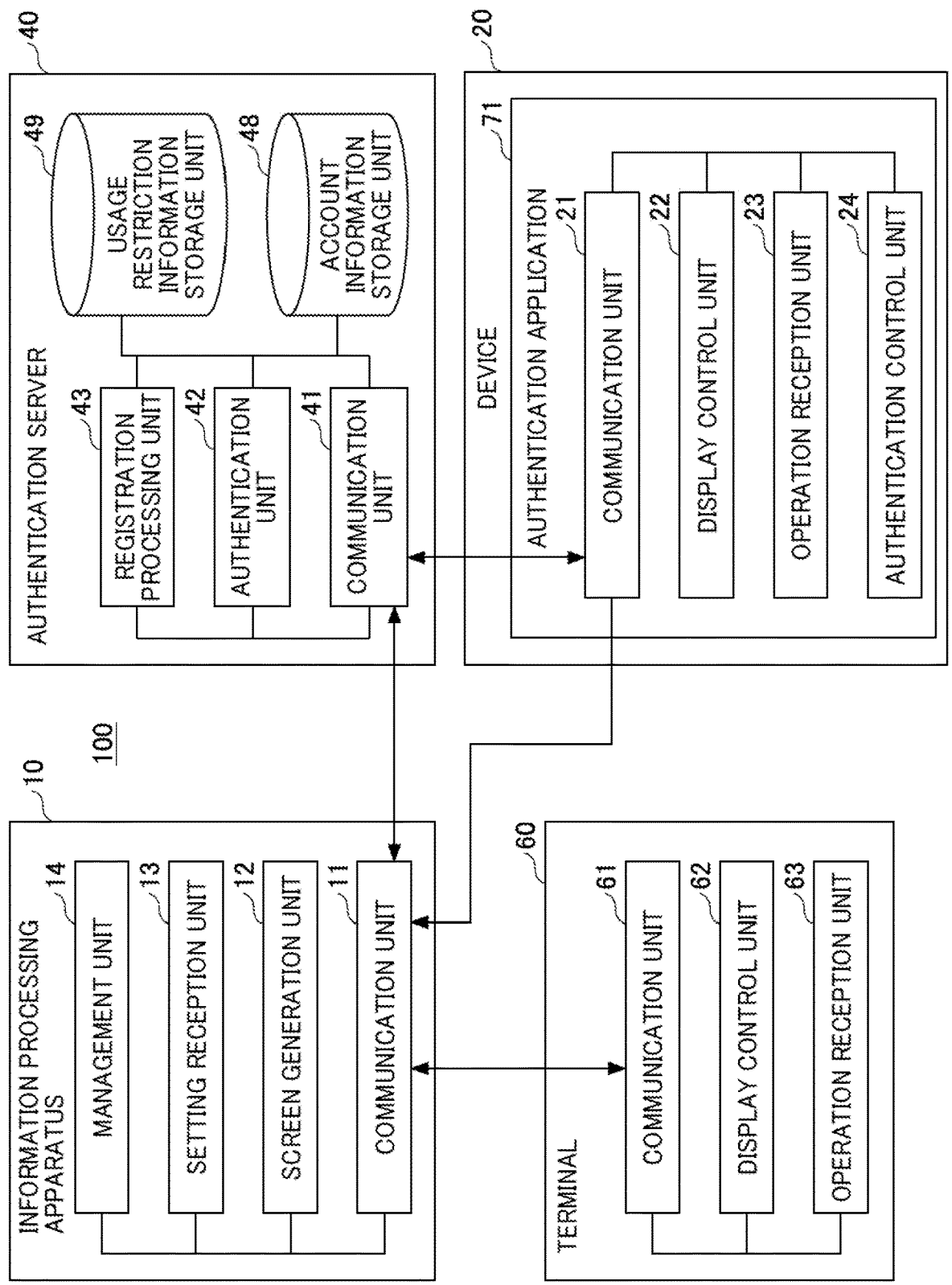
FIG. 6 is a block diagram illustrating a functional configuration of an example of an information processing system.

A functional configuration of the information processing system 100 according to the present embodiment is described with reference to FIG. 6. FIG. 6 is a block diagram illustrating the functional configuration of an example of the information processing system 100 according to the present embodiment.

The device 20 includes a communication unit 21, a display control unit 22, an operation reception unit 23 and an authentication control unit 24. Each of these functional units included in the device 20 is a function implemented by the CPU 901 illustrated in FIG. 4 executing an instruction included in one or more programs (the authentication application) installed in the device 20.

The communication unit 21 transmits and receives various information to and from the information processing apparatus 10 or the authentication server 40. In the present embodiment, the communication unit 21 requests the information processing apparatus 10 for the guest user account information. In addition, the communication unit 21 designates the guest user account information and requests authentication from the authentication server 40.

The display control unit 22 displays a login screen or the like on the display panel 940*a* using display components stored in advance.

The operation reception unit 23 receives operation of the user on various screens displayed on the display panel 940*a*.

The authentication control unit 24 performs control related to authentication and control related to communication with the information processing apparatus 10 and the authentication server 40 based on a predetermined process for guest user authentication.

The information processing apparatus 10 includes a communication unit 11, a screen generation unit 12, a setting reception unit 13, and a management unit 14. These functional units of the information processing apparatus 10 are functions implemented by the CPU 501 illustrated in FIG. 3 executing instructions included in one or more programs installed in the information processing apparatus 10.

One or more of the functions of the information processing apparatus 10 may be distributed among a plurality of information processing apparatuses. Also, the functions of the information processing apparatus 10 and the functions of the authentication server 40 may be implemented in one information processing apparatus, a part of the functions of the information processing apparatus 10 may be implemented in the authentication server 40, or a part of the functions of the authentication server 40 may be implemented in the information processing apparatus 10.

The communication unit 11 transmits and receives various information to and from the device 20, the terminal 60, and the authentication server 40. In the present embodiment, the communication unit 11 transmits the guest user account information to the device 20 and the authentication server 40.

The screen generation unit 12 generates screen information for various settings displayed by the terminal 60. The setting reception unit 13 receives settings related to the guest user account information transmitted from the terminal 60. The setting reception unit 13 also stores the guest user account information in the management unit 14 and transmits the guest user account information to the authentication server 40.

The screen information is a program described in HyperText Markup Language (HTML), Extensible Markup Language (XML), a script language, and Cascading Style Sheet (CSS). The structure of the web page is mainly defined by HTML, the operation of the web page is defined by the script language, and the style of the web page is defined by CSS.

The management unit 14 manages information on guest user login, as described in FIG. 7. FIG. 7 is an example of on-premises account information stored by the management unit 14. The on-premises account information is a character string equivalent to a password. The authentication server 40 authenticates the guest user with the on-premises account information (no other information such as user ID is to be input). The on-premises account information corresponds to the guest user account information.

In addition, the management unit 14 manages guest login-permitted device information, as described with reference to FIG. 8. FIG. 8 is an example of the guest login-permitted device information managed by the management unit 14. In the guest login-permitted device information, whether guest user login is valid or invalid (whether guest users is permitted to log in) is set in association with a device number. The device number is identification information of the device 20. Whether or not the guest login button is displayed on the login screen is controlled depending on whether the guest login-permitted device information is valid or invalid.

The authentication server 40 includes a communication unit 41, an authentication unit 42, a registration processing unit 43, an account information storage unit 48, and a usage restriction information storage unit 49. These functional units of the authentication server 40 are functions implemented by the CPU 501 illustrated in FIG. 3 executing commands included in one or more programs installed in the authentication server 40. One or more of the functions of authentication server 40 may be distributed among a plurality of information processing apparatuses.

The communication unit 41 transmits and receives various information to and from the device 20 and the information processing apparatus 10. In the present embodiment, the communication unit 41 receives the guest user account information from the device 20 and the information processing apparatus 10 and transmits an authentication result to the device 20.

The authentication unit 42 authenticates users based on account information. The account information is stored in the account information storage unit 48. The account information storage unit 48 is implemented in the HD 504 or the like illustrated in FIG. 3. In the case the authentication request includes information indicating that the guest login button has been pressed, the authentication unit 42 authenticates the user with the password alone.

The registration processing unit 43 performs processing for registering usage restriction information in the usage restriction information storage unit 49 and registering the guest user account information in the account information storage unit 48.

FIG. 9 illustrates an example of the account information stored in the account information storage unit 48. The account information of the user who uses the information processing system 100 is stored in the account information storage unit 48 in association with the user ID (user identification information). The account information is, for example, a password. However, in addition to the user authentication performed by the user ID and password, the authentication unit 42 may perform user authentication with "mail address and password", "tenant ID, user ID, and password", "IC card", "personal identification number (PIN)", etc.

In the case the user is an employee or the like, the account information of each employee is registered in advance. As for the guest user, the account information of the guest user is registered by settings by the administrator. Since the account information of the guest user is the same as the user ID, the same character string "GUEST" is registered in the user ID and the account information. This character string "GUEST" corresponds to the on-premises account information. The authentication server 40 authenticates the guest users using the on-premises account information.

FIG. 10 is a table illustrating an example of the usage restriction information stored in the usage restriction information storage unit 49. In the usage restriction information storage unit 49, a function of the device 20 for which the use is restricted (or a function for which the use is permitted) is registered in association with the on-premises account information. An example of the settings are illustrated as follows in FIG. 10.

Copy: black and white permitted, Printer: restricted, Facsimile: permitted, Scan: permitted, Document box: permitted.

In this way, the information processing system 100 limits functions available to the guest user based on the usage restriction information.

The terminal 60 includes a communication unit 61, a display control unit 62, and an operation reception unit 63. Each of these functional units is a function implemented by the CPU 501 illustrated in FIG. 3 executing instructions included in one or more programs installed in the computer 500. This program may be a web browser or dedicated software.

The communication unit 61 transmits and receives various information to and from the information processing apparatus 10. In the present embodiment, various screen information and the like are received from the information processing apparatus 10 and information set by the administrator is transmitted to the information processing apparatus 10.

The display control unit 62 interprets screen information of various screens and displays screens on the display 506.

The operation reception unit 63 receives various user operations on various screens displayed on the display 506.

Figure 11:
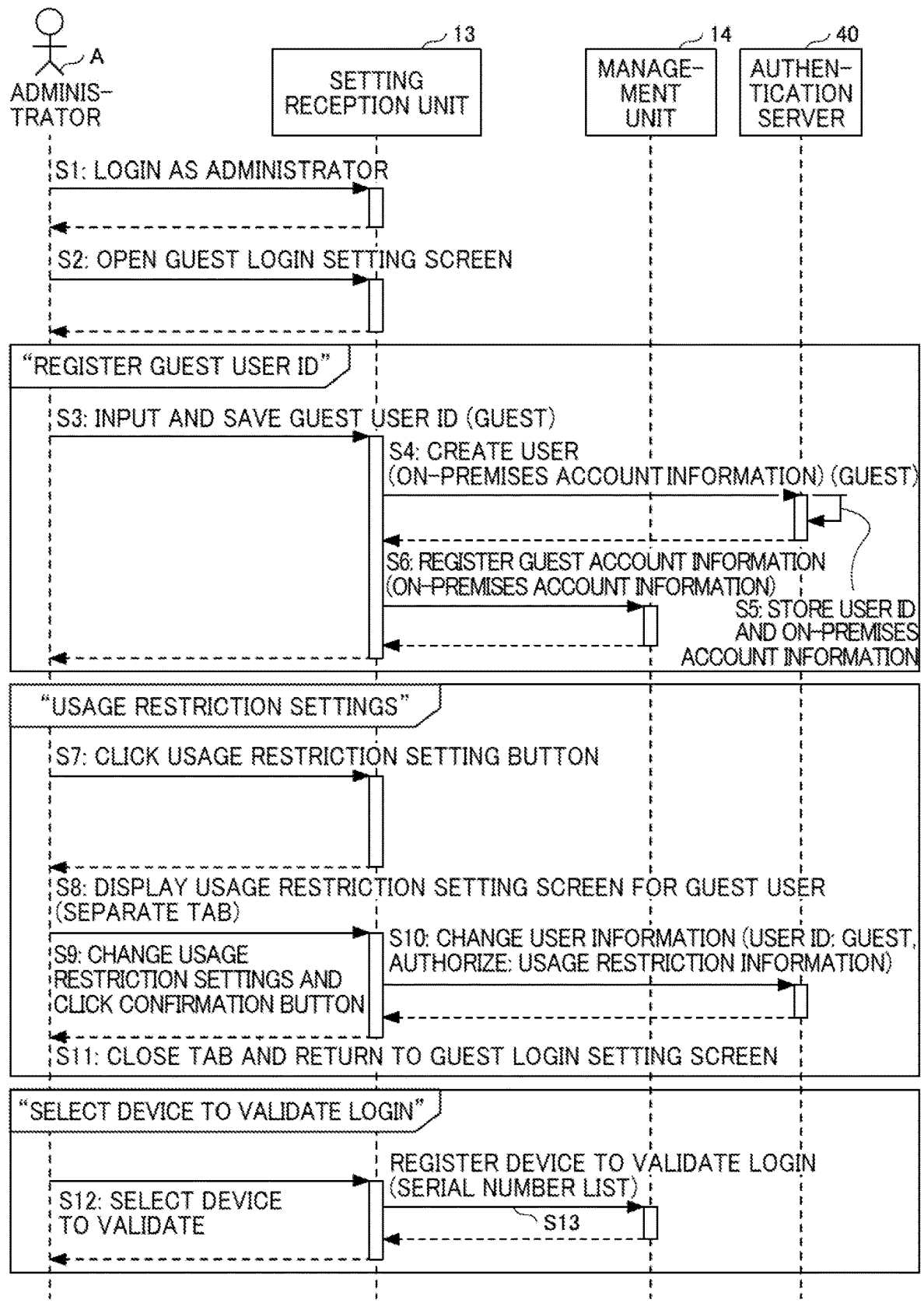
FIG. 11 is a sequence diagram illustrating an example of a registration process for an administrator to register guest user account information.

With reference to FIG. 11, a process of registering the guest user account information and the like in the information processing apparatus 10 by the administrator is described. FIG. 11 is an example of a sequence diagram illustrating a process of registering guest user account information and the like by the administrator. The administrator mainly performs the following three processes.

(i) Registration of the guest user ID: The administrator registers the user ID assigned to the guest user. The user ID becomes the on-premises account information.

(ii) Usage restriction settings: The administrator makes settings to restrict the functions of the image forming apparatus (copy, scan, print, etc.) permitted to the guest user.

(iii) Selection of devices 20 to permit guest login: The administrator selects the device 20 to use the guest login function (because there are devices 20 that the administrator wants the temporary user to use and devices 20 that are not).

S1: The administrator operates the terminal 60 to input account information and logs in to the information processing apparatus 10.

S2: The administrator operates to display the guest login setting screen on the terminal 60. The operation reception unit 63 of the terminal 60 receives the operation, and the communication unit 61 requests the information processing apparatus 10 for the guest login setting screen. The screen generation unit 12 of the information processing apparatus 10 generates the guest login setting screen, and the communication unit 11 transmits screen information of the guest login setting screen to the terminal 60. Accordingly, the display control unit 62 of the terminal 60 displays the guest login setting screen. FIG. 12 is a diagram illustrating an example of the guest login setting screen.

S3: The administrator enters the user ID of the guest user on the guest login setting screen and presses a save button. The operation reception unit 63 of the terminal 60 receives the operation. The communication unit 61 transmits the guest user's user ID to the information processing apparatus 10.

S4: The communication unit 11 of the information processing apparatus 10 receives the user ID of the guest user, and the setting reception unit 13 designates the user ID (on-premises account information) and transmits a user creation request to the authentication server 40.

S5: The communication unit 41 of the authentication server 40 receives the user ID and the user creation request, and the registration processing unit 43 stores the guest user's user ID and password in the account information storage unit 48. The password is the on-premises account information (user ID). The user ID and the password have the same value. Since the authentication unit 42 authenticates the users with the on-premises account information, the on-premises account information is unique for each user. Therefore, when the user ID is duplicated, the registration processing unit 43 prompts resetting.

S6: The setting reception unit 13 registers the on-premises account information in the management unit 14. In response to a completion of the registration, the screen generation unit 12 causes the terminal 60 to display a guest user creation completion dialog.

S7: In order to limit (select) the functions permitted to be used by the guest user, the administrator presses the usage restriction setting button on the guest login setting screen. The operation reception unit 63 receives the operation by the administrator.

S8: Accordingly, the display control unit 62 displays the usage restriction setting screen. The transition from the guest login setting screen to the usage restriction setting screen may be performed by the information processing apparatus 10 or may be performed by the terminal 60. FIG. 13 is a diagram illustrating an example of the usage restriction setting screen.

S9: The administrator presses the radio button associated with each function of the usage restriction setting screen. The operation reception unit 63 receives these operations. The communication unit 61 transmits the usage restriction information generated according to the pressed radio button to the authentication server 40 in association with the on-premises account information.

S10: The communication unit 41 of the authentication server 40 receives the usage restriction information and the registration processing unit 43 registers the usage restriction information (see FIG. 10) in the usage restriction information storage unit 49 in association with the on-premises account information.

S11: In response to the closing of the usage restriction setting screen by the administrator, the display control unit 62 displays the guest login setting screen again.

S12: The administrator selects the device 20 for enabling the guest login function on the guest login setting screen. The operation reception unit 63 receives selection of the device 20. The communication unit 61 transmits a list of the devices 20 to the information processing apparatus 10.

S13: The communication unit 11 of the information processing apparatus 10 receives the list of the devices 20, and the setting reception unit 13 stores the list of the devices 20 in the management unit 14. The list of devices 20 is a list of device numbers.

FIG. 12 is a diagram illustrating an example of the guest login setting screen 200. Each item of the guest login setting screen 200 is described below.

A user ID field 201 is a space for the administrator to enter a user ID. The entered user ID becomes the on-premises account information.

The save button 202 is a button for the terminal 60 to send the user ID to the information processing apparatus 10.

A usage restriction setting button 203 is a button for displaying a usage restriction setting screen on the terminal 60.

The list of devices 20 managed by the information processing apparatus 10 is displayed in the device list table 204. The device list table 204 includes valid and invalid radio buttons 205 for each device 20. Whether the administrator permits the guest user to log in to each device 20 is set by pressing the valid or invalid radio button 205.

FIG. 13 is a diagram illustrating an example of a usage restriction setting screen 210. Each item of the usage restriction setting screen 210 is described below.
Copy Settings Field 211*a*

Color settings available to the guest user in the copy function are displayed. By pressing the radio buttons 211*b*, the administrator sets color settings available to the guest user in the copy function. The administrator may also prohibit the copy function.
Print Settings Field 212*a*

Color settings available to the guest user in the print function are displayed. By pressing the radio buttons 212*b*, the administrator sets color settings available to the guest user in the print function.

The print function may be prohibited by the administrator.
Facsimile Settings Field 213*a*

The administrator presses the radio buttons 213*b* to set whether the guest user is permitted to use the facsimile function.
Scan Settings Field 214*a*

The administrator presses the radio buttons 214*b* to set whether the guest user is permitted to use the scanner function.
Document Box Settings Field 215*a*

The administrator presses the radio buttons 215*b* to set whether the guest user is permitted to use the document box function.

Figure 14:
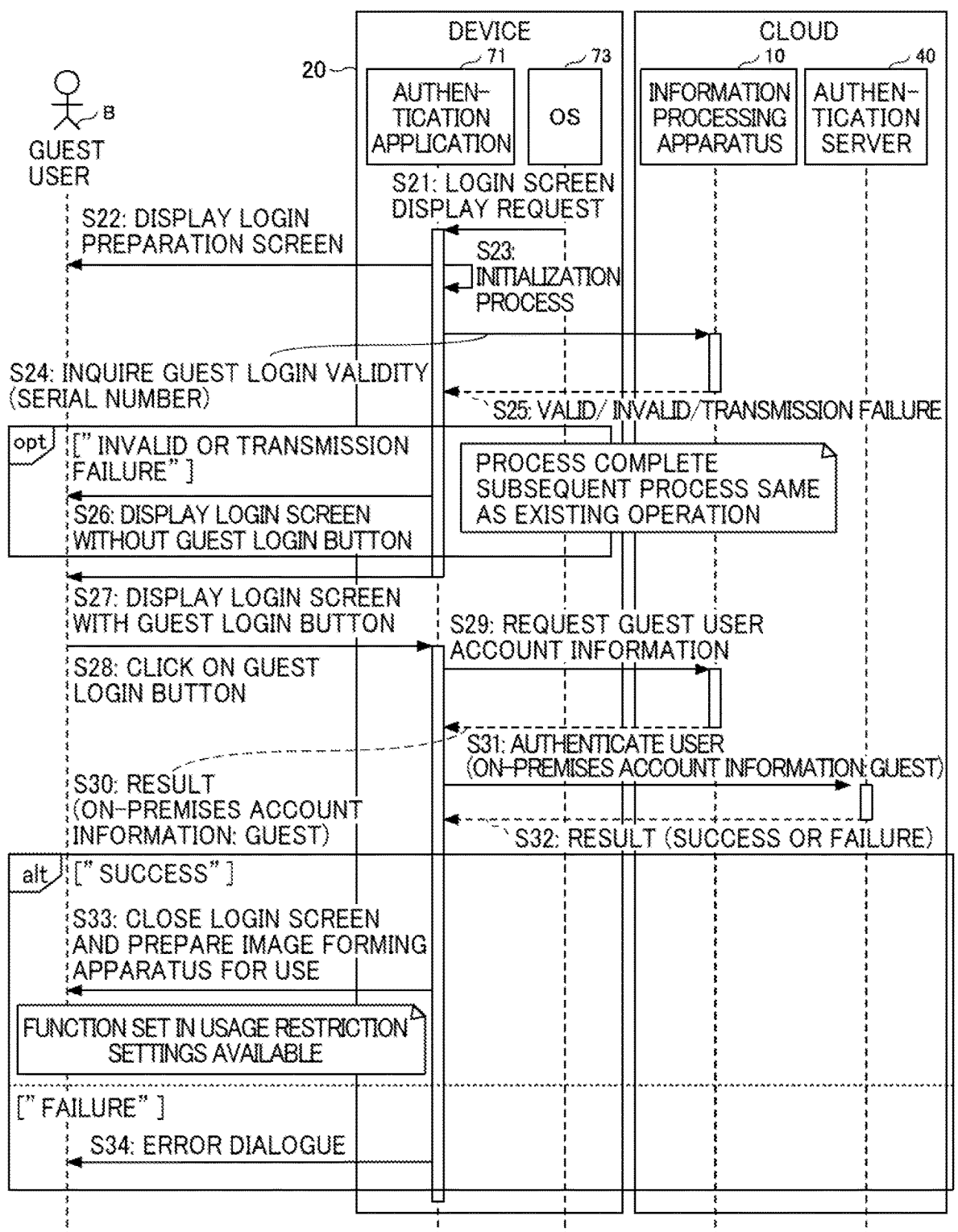
FIG. 14 is a sequence diagram illustrating an example of a login process for a guest user to log into a device.

With reference to FIG. 14, a guest user login process is described. FIG. 14 is a sequence diagram illustrating an example of a login process for the guest user to log in to the device 20.

S21: In response to an activation of the device 20, the OS 73 activates the authentication application 71 and requests the authentication application 71 to display a login screen. In order to reflect the settings made on the guest login setting screen to the login screen, the device 20 is recovered from the energy saving state, turned on, or the like.

S22: The authentication application 71 displays a login preparation screen (for example, "Please wait." is displayed).

S23: The authentication application 71 performs an initialization process. Since the initialization process is not directly related to the present embodiment, details thereof are omitted.

S24: After activation, the authentication control unit 24 inquires the information processing apparatus 10 whether the guest login function of the device 20 is valid. The device number is included in the inquiry. In addition to the device number, the information that identifies the device may be any information that identifies the device 20, such as an authentication ticket.

S25: The communication unit 11 of the information processing apparatus 10 receives the inquiry, and returns to the device 20 whether the guest login function is valid or invalid registered in the guest login-permitted device information in association with the device number.

S26: In response to receiving the guest login-permitted device information "invalid" by the communication unit 21 of the device 20, the display control unit 22 displays a login screen without the guest login button. That is, the device 20 displays a standard login screen. By doing so, the device 20 is restricted from displaying the guest login button even though the guest user is not permitted to log in.

S27: In response to receiving the guest login-permitted device information "valid" by the communication unit 21 of the device 20, the display control unit 22 displays a login screen with the guest login button. FIG. 15 illustrates the login screen.

S28: The guest user presses the guest login button on the login screen. The operation reception unit 23 receives pressing of the button.

S29: The authentication control unit 24 of the device 20 requests the information processing apparatus 10 for the guest user account information through the communication unit 21.

S30: The communication unit 11 of the information processing apparatus 10 receives the request for the guest user account information and transmits the on-premises account information acquired from the management unit 14 to the device 20.

S31: The communication unit 21 of the device 20 receives the on-premises account information. The authentication control unit 24 sends an authentication request to the authentication server 40 via the communication unit 21 indicating that the guest login button has been pressed and the on-premises account information.

S32: The communication unit 41 of the authentication server 40 receives the authentication request indicating that the guest login button has been pressed and the on-premises account information. The authentication unit 42 authenticates the guest user based on the password in the account information storage unit 48. As described above, in response to the pressing of the guest login button, the authentication is performed by the on-premises account information (password) alone. Based on the on-premises account information (password) stored in the account information storage unit 48, the authentication is successful. However, the authentication unit 42 may authenticate with a combination of a user ID and a password. The communication unit 41 transmits the authentication result (success or failure) to the device 20. In response to the successful authentication, the communication unit 41 transmits the usage restriction information stored in the usage restriction information storage unit 49 to the device 20.

S33: The communication unit 21 of the device 20 receives the authentication result. In response to the successful authentication, the communication unit 21 receives the usage restriction information. The display control unit 22 of the device 20 closes the login screen and displays a screen (home screen) to enable the use of the device 20. The usage restriction information is reflected to the home screen, and for example, functions permitted to be used by the guest user are displayed, while functions restricted to be used are displayed with reduced brightness. The usage restriction information is reflected also for sub-screens branching off from the home screen.

S34: In response to a failure in the authentication, the display control unit 22 of the device 20 displays an error dialog.

Thus, even in the case the guest user does not have the account information, the user is permitted to log in to the device 20 and use the device 20.

FIG. 15 is a diagram illustrating an example of a login screen 220 displayed by the device 20. Each item on the login screen 220 is described in the following.

A user ID field 221 and a password field 222 are fields where the general user inputs the user ID and the password respectively.

A login button 223 is a button for the general user to request the authentication server 40 for authentication using the user ID in the user ID field 221 and the password in the password field 222.

The guest login button 224 is a button for the guest user to log in, and is displayed on the devices 20 with the guest login function set to "valid". The guest user does not enter the user ID and password. The device 20 may emphasize the guest login button 224, for example, with an arrow or the like, and a message stating "Please press this button for a guest to log in."

As described above, the information processing system 100 of the present embodiment permits the guest user to use the device 20 without knowing (or inputting) the user account information. The information processing apparatus 10 is able to limit the functions of the device 20 available to the guest user using the usage restriction information. The device 20 displays the guest login button in the case the guest user login is enabled.

For example, in the case where each device 20 is set to permit the guest user to log in, the guest login button 224 may be displayed in response to the guest user holding a guest IC card over the device 20. Alternatively, the guest login button 224 may be displayed when the guest user holds the guest IC card over the device 20 even when the device 20 is set not to permit the guest user to log in.

Also, the login button may be a hard key. In this case, the device 20 disables the hard key according to the setting as to whether or not guest user login is permitted. The device 20 may display a message such as "Press the triangle button to log in." in the case the hard key is valid.

Further, the login screen may be displayed by the device 20 based on a web page generated by the information processing apparatus 10. In this case, the information processing apparatus 10 transmits the screen information of the login screen with and without the guest login button to the device 20 according to the setting as to whether or not the guest user's login is permitted. Similarly for the usage restriction settings, the information processing apparatus 10 generates a screen to select the functions available to the guest user based on the usage restriction settings, and transmits the screen information to the device 20.

Further, the division of blocks in the functional block diagram illustrated in FIG. 6 is an example, and a plurality of blocks may be implemented as one block, one block may be divided into a plurality of blocks, and some functions may be transferred to another block. In addition, functions of the plurality of blocks having similar functions may be processed by a single piece of hardware or software in parallel or in a time division manner.

The apparatuses or devices described in one or more embodiments are just one example of plural computing environments that implement the one or more embodiments disclosed herein. In some embodiments, the information processing apparatus 10 includes multiple computing devices, such as a server cluster. The plurality of computing devices is configured to communicate with one another through any type of communication link, including a network, shared memory, etc., and perform the processes disclosed herein.

Further, the information processing apparatus 10 may be configured to share the processing steps disclosed in the present embodiment, such as FIGS. 11, 14, etc., in various combinations. For example, a process executed by a given unit may be executed by a plurality of information processing apparatuses included in the information processing apparatus 10. Further, the information processing apparatus 10 may be integrated into one server, or may be divided into a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising:
an information processing apparatus; and
a device communicably connected with the information processing apparatus via a network, the device having identification information identifying the device,
the information processing apparatus including circuitry configured to
store in one or more memories, information of whether a login of a temporary user is permitted, in association with the identification information of the device, and
notify the device of the information of whether the login of the temporary user is permitted based on the identification information of the device,
the device including circuitry configured to
in response to receiving a notification that the login of the temporary user is permitted, display on a display, an operation component for receiving a predetermined operation, and
in response to receiving the predetermined operation, request the information processing apparatus for account information of the temporary user,
wherein the circuitry of the information processing apparatus is further configured to
transmit the account information to the device, and
wherein the circuitry of the device is further configured to
request an authentication server for authentication, designating the account information received from the information processing apparatus, to acquire an authentication result.

2. The information processing system of claim 1, wherein the circuitry of the device is further configured to, in response to receiving an authentication result indicating successful authentication from the authentication server, restrict use of a function of the device, according to usage restriction information of the temporary user received from the authentication server.

3. The information processing system of claim 1, wherein the circuitry of the information processing apparatus is further configured to:
transmit screen information of a guest login setting screen to a terminal for display on a display of the terminal;
receive settings of the account information input to the guest login setting screen;
store the account information in the one or more memories; and
request the authentication server to store the account information.

4. The information processing system of claim 3, wherein the circuitry of the information processing apparatus is further configured to:
receive settings of usage restriction information of the device input to a usage restriction setting screen for the temporary user, displayed on the display of the terminal; and
the authentication server stores the usage restriction information of the temporary user in association with the account information.

5. The information processing system of claim 3, wherein the circuitry of the information processing apparatus is further configured to:
receive settings as to whether to permit the temporary user to log in to each device, input to the guest login setting screen; and
store in the one or more memories, information of whether to permit the login of the temporary user in association with a device number of the device.

6. A device communicably connected with an information processing apparatus via a network, the information processing apparatus configured to store in one or more memories, information of whether a login of a temporary user is permitted, in association with identification information identifying the device, the device comprising:
circuitry configured to:
in response to receiving a notification that the login of the temporary user is permitted from the information processing apparatus, display on a display, an operation component for receiving a predetermined operation;
in response to receiving the predetermined operation, request the information processing apparatus for account information of the temporary user;
receive the account information from the information processing apparatus;
request an authentication server for authentication, designating the account information received from the information processing apparatus; and
acquire an authentication result.

7. An authentication method performed by a device communicably connected with an information processing apparatus via a network, the authentication method comprising:
storing in one or more memories of the information processing apparatus, information of whether a login of a temporary user is permitted, in association with identification information identifying the device;
notifying the device of the information of whether the login of the temporary user is permitted based on the identification information of the device;
in response to receiving a notification that the login of the temporary user is permitted, displaying on a display of the device, an operation component for receiving a predetermined operation, and
in response to receiving the predetermined operation, requesting the information processing apparatus for account information of the temporary user;
receiving the account information from the information processing apparatus;
requesting an authentication server for authentication, designating the account information received from the information processing apparatus; and
acquiring an authentication result.

* * * * *